(12) United States Patent
Smith

(10) Patent No.: US 6,799,196 B1
(45) Date of Patent: Sep. 28, 2004

(54) ON-DEMAND DATA STREAMING PARCELING

(75) Inventor: Kim C. Smith, Colleyville, TX (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/489,127

(22) Filed: Jan. 21, 2000

(51) Int. Cl.[7] .............................................. G06F 15/16
(52) U.S. Cl. ........................................ 709/203; 345/700
(58) Field of Search ........................... 709/203; 345/700, 345/744, 723, 864; 707/526

(56) References Cited

U.S. PATENT DOCUMENTS

| | | | |
|---|---|---|---|
| 4,845,658 A | 7/1989 | Gifford ........................ 364/900 |
| 5,414,865 A | 5/1995 | Beran .......................... 395/800 |
| 5,604,487 A | 2/1997 | Frymier ................. 340/825.07 |
| 5,611,047 A | 3/1997 | Wakamiya et al. .... 395/200.01 |
| 5,649,186 A | 7/1997 | Ferguson et al. ........... 395/610 |
| 5,774,668 A | 6/1998 | Choquier et al. ...... 395/200.53 |
| 5,790,789 A | 8/1998 | Suarez ................... 395/200.32 |
| 5,850,517 A | 12/1998 | Verkler et al. ......... 395/200.32 |
| 5,867,821 A | 2/1999 | Ballantyne et al. ............ 705/2 |
| 5,881,232 A | 3/1999 | Mizuno et al. ........ 395/200.47 |
| 5,892,911 A | 4/1999 | Ishibashi et al. ....... 395/200.47 |
| 5,901,287 A | 5/1999 | Bull et al. ............. 395/200.48 |
| 5,923,362 A | 7/1999 | Klosterman .................. 348/12 |
| 6,148,334 A * | 11/2000 | Imai et al. ................... 709/219 |
| 6,167,441 A * | 12/2000 | Himmel ....................... 709/217 |
| 6,173,316 B1 * | 1/2001 | De Boor et al. ............ 709/218 |
| 6,211,871 B1 * | 4/2001 | Himmel et al. ............. 345/744 |
| 6,343,313 B1 * | 1/2002 | Salesky et al. ............. 709/204 |
| 6,438,576 B1 * | 8/2002 | Huang et al. ............... 709/202 |
| 6,476,833 B1 * | 11/2002 | Moshfeghi ................... 345/854 |

\* cited by examiner

*Primary Examiner*—Mehmet B. Geckil
(74) *Attorney, Agent, or Firm*—Scott Charles Richardson; Jeffrey A. Proehl; Kaardal & Leonard

(57) ABSTRACT

A client device, or information appliance such as a personal digital assistant, is capable of receiving multimedia data streams from a server. However, due to processing and display capabilities, the client device may not be able to present the complete data stream, or a user may elect to configure the client device not to process data that will unduly reduce the client device's performance. Accordingly, the present invention provides a method and apparatus for allowing a server to determine the native, or user selected, capabilities of a client device, such that the server can filter and parse the data into meaningfully presentable data and non-meaningfully presentable data, and then transmit only the meaningfully presentable data to the client device for processing and display. In an alternative embodiment, the server sends the complete data stream to the client device, and the client device filters and parses the data, and then processes only the meaningfully presentable data for display on the client device.

24 Claims, 3 Drawing Sheets ated the data provided on the Internet may be delivered in a manner appropriate to the broad range of client devices.

ON-DEMAND DATA STREAMING PARCELING

FIELD OF THE INVENTION

The present invention relates generally to handling data streams in networked systems, and more specifically to parsing out those parts of a data stream usable by a client device for processing by the client device.

BACKGROUND

A broad range of electronic devices have been developed, and continue to be developed, that provide a broad range of communication capabilities. Mobile phone designs provide Internet access functions, personal digital assistant (PDA) devices have radio connectivity to the Internet and are able to access e-mail and Internet web pages, and television set-top boxes similarly provide Internet access. This broad range of devices is comprised of devices of varying processing power and user interface capabilities, from a fully-equipped multimedia Personal Computer (PC) to a mobile phone or PDA that provides only a single-color, low-resolution display with no sound capability. Because all these devices are currently being employed to access Internet data, it is desirable to ensure that data provided on the Internet may be delivered in a manner appropriate to the broad range of client devices.

For example, mobile phone and PDA access is, in some current products, limited to only accessing either the text portion of a web page, or specially-designed web pages that are specifically tailored to be displayed on the intended client device. Such a method is practical for the client, but it is inefficient and often impractical to create alternate web sites for each of a large variety of client types that may be employed to access the web content.

Also, the use of text-only display of sites that are typically provided as graphic-intensive web pages often hinders navigation of the web site, which relies upon a user being able to view and click on a large, complex graphic to select web pages or other content for viewing. Although most Internet clients are capable of searching for and downloading any type of content, many clients are unable to display many types of content in a meaningful way.

What is desired is a method and apparatus that enables clients that are unable to download and process various types of content to download and process only those portions of the content that the client is capable of presenting in a meaningful way, and to store or retrieve content the client cannot display for viewing on another client with the capability to view the stored data.

SUMMARY OF THE INVENTION

The present invention provides, in various embodiments, a method and apparatus that enables clients to receive and process a filtered or parsed portion of provided content upon determination that such content is displayable on the client device through the use of a client configuration. The clients that are unable to process and present various types of content, or that are configured by a user preference not to present various types of content, will only display those filtered or parsed portions of the content that the client is capable of presenting in a meaningful way. Content that the client cannot, or preferably will not, display can be stored for later retrieval, discarded, or ignored. The various embodiments of the present invention therefore provide enhanced capability for a client to receive at least a portion of a collection of data it cannot, in its entirety, present in a meaningful way, and to store that portion of the content for later use.

For example, a client device may be capable of displaying graphics, but because displaying such graphics would slow down the processing and presentation of the content to an unacceptable rate, a user may select a configuration that classifies graphical content as data that cannot be meaningfully presented by the client device, and thus, even though the capability exists, the device will parse out the graphical content during reception of the content. However, since this data is being stored, if the user later decides to view such accompanying graphics, the content can be retrieved by the user.

DETAILED DESCRIPTION

In the following detailed description of preferred embodiments of the invention, reference is made to the accompanying drawings which form a part hereof, and in which is shown by way of illustration, specific sample embodiments in which the invention may be practiced. These embodiments are described in sufficient detail to enable those skilled in the art to practice the invention, and it is to be understood that other embodiments may be utilized and that logical, mechanical, electrical, and/or other changes may be made without departing from the spirit or scope of the present invention. The following detailed description is, therefore, not to be taken in a limiting sense, and the scope of the invention is defined only by the appended claims.

The present invention provides in various preferred embodiments a method and apparatus that enables clients that are unable to download and present various types of content, or that are configured not to download or present various types of content, to download, process and display only those portions of the content that the client is capable of presenting in a meaningful way, and in further embodiments, to store or retrieve content the client cannot meaningfully display for viewing on another networked computerized system having the capability to view the stored data.

Figure 1:
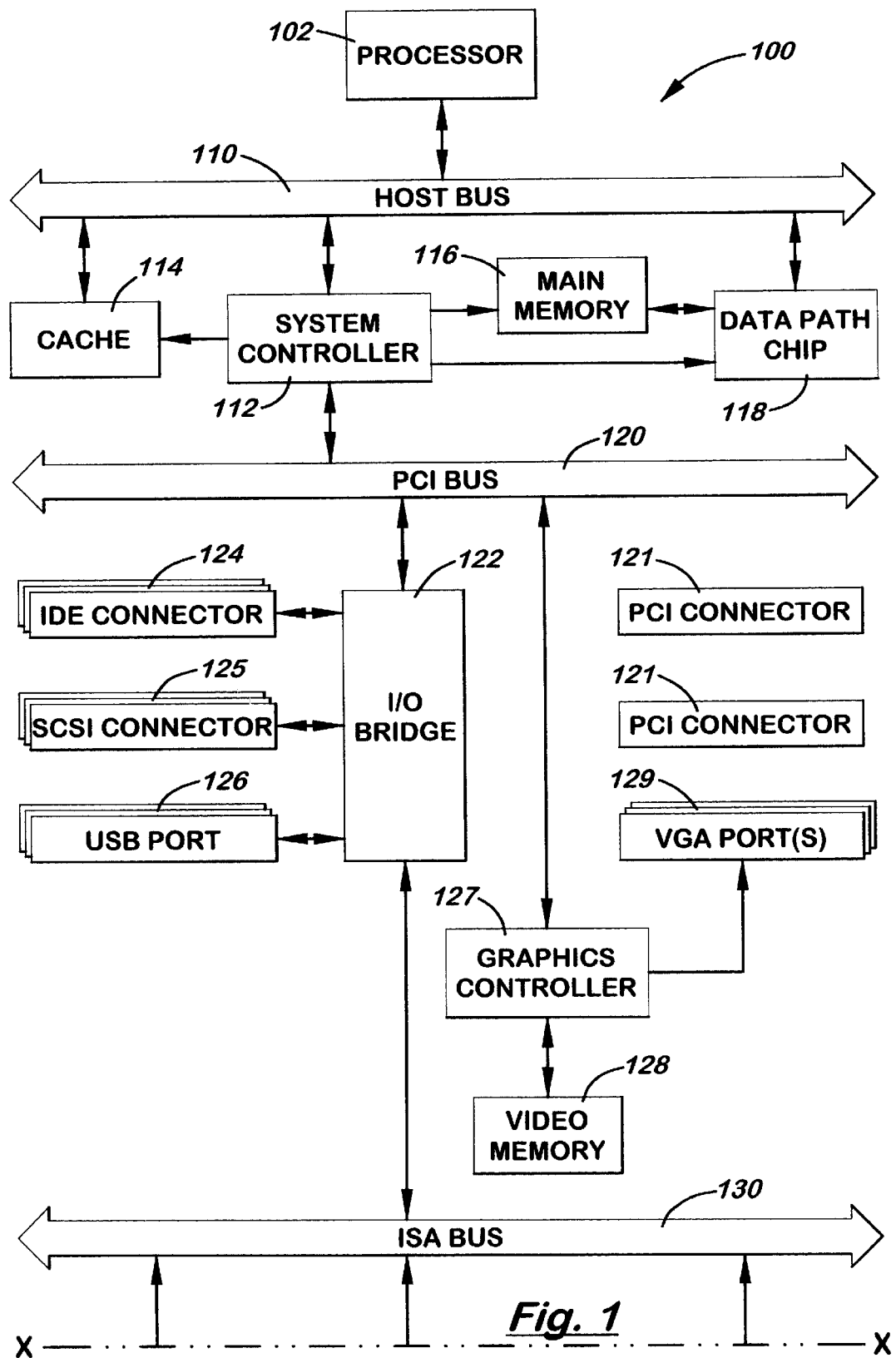
FIG. 1 shows a general-purpose information handling system forming a portion of the network system of the present invention.
Figure 1:
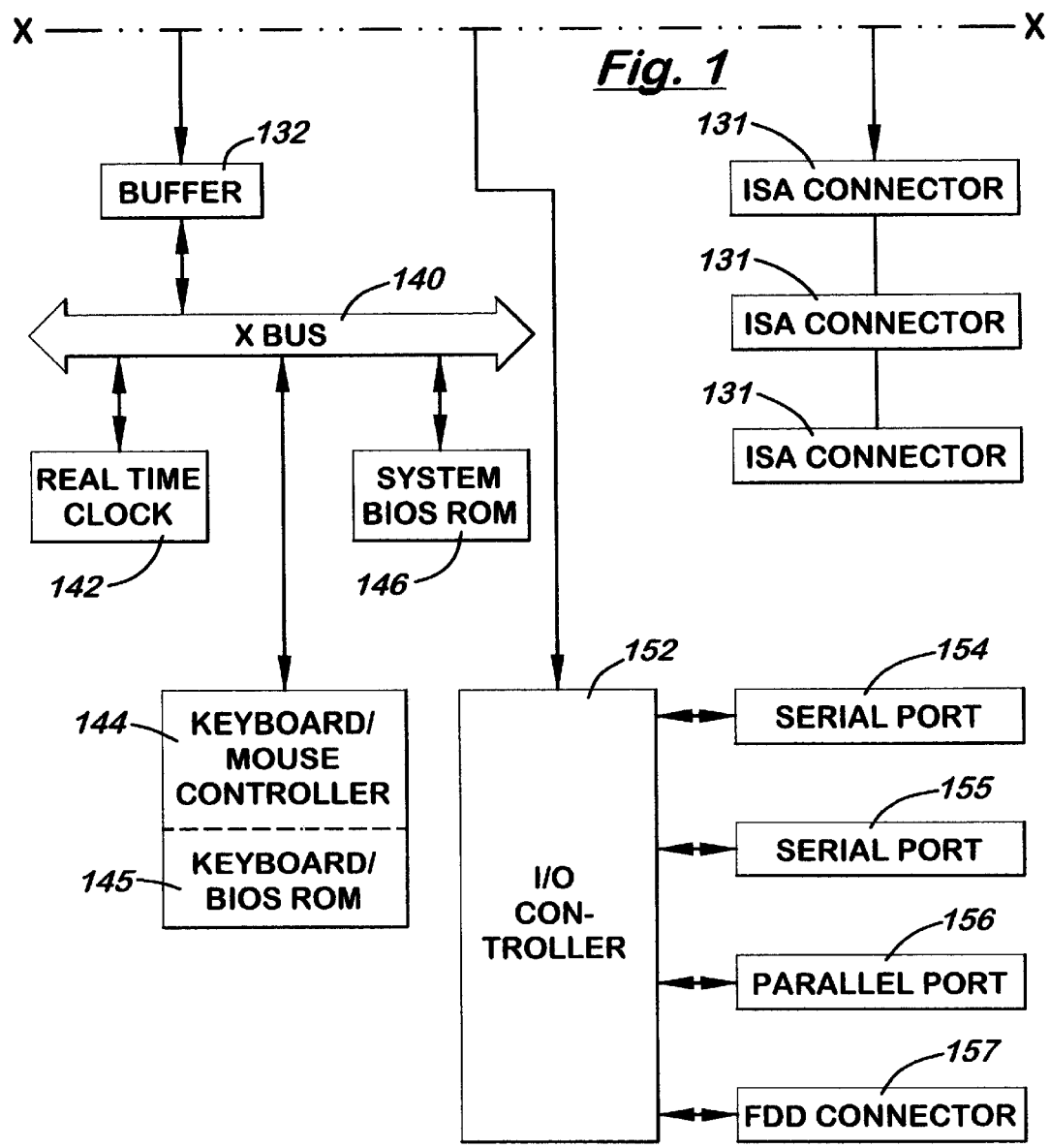

FIG. 1 illustrates a general-purpose information handling system, or personal computer system, 100, on which various embodiments of the invention may be practiced. In this embodiment, processor 102, system controller 112, cache 114, and data-path chip 118 are each coupled to host bus 110. Processor 102 is a microprocessor such as a 486-type chip, a Pentium®, Pentium II® or other suitable microprocessor. Cache 114 provides high-speed local-memory data (in one embodiment, for example, 512 KB of cache memory) for processor 102, and is controlled by system controller 112, which loads cache 114 with data that is expected to be used soon after the data is placed in cache 114 (i.e., in the near future). Main memory 116 is coupled between system controller 114 and data-path chip 118, and in one embodiment, provides random-access memory of between 16 MB and 128 MB of data. In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding many of the other components shown in FIG. 1. Main memory 116 includes standard DRAM (Dynamic Random-Access Memory), EDO (Extended Data Out) DRAM, SDRAM (Synchronous DRAM), RDRAM (Rambus DRAM), or other suitable memory technology. System controller 112 controls PCI (Peripheral Component Interconnect) bus 120, a local bus for system 100 that provides a high-speed data path between processor 102 and various peripheral devices, such as graphics devices, storage drives, network cabling, etc. Data-path chip 118 is also controlled by system controller 112 to assist in routing data between main memory 116, host bus 110, and PCI,bus 120.

In one embodiment, PCI bus 120 provides a 32-bit-wide data path that runs at 33 MHz. In another embodiment, PCI bus 120 provides a 64-bit-wide data path that runs at 33 MHz. In yet other embodiments, PCI bus 120 provides 32-bit-wide or 64-bit-wide data paths that runs at higher speeds. In one embodiment, PCI bus 120 provides connectivity to I/O bridge 122, graphics controller 127, and one or more PCI connectors 121 (i.e., sockets into which a card edge may be inserted), each of which accepts a standard PCI card. In one embodiment, I/O bridge 122 and graphics controller 127 are each integrated on the motherboard along with system controller 112, in order to avoid a board-connector-board signal-crossing interface and thus provide better speed and reliability. In the embodiment shown, graphics controller 127 is coupled to a video memory 128 (that includes memory such as DRAM, EDO DRAM, SDRAM, or VRAM (Video Random-Access Memory)), and drives VGA (Video Graphics Adaptor) port 129. VGA port 129 can connect to industry-standard monitors such as VGA-type, SVGA (Super VGA)-type, XGA-type (extended Graphics Adaptor) or SXGA-type (Super XGA) display devices. Other input/output (I/O) cards having a PCI interface can be plugged into PCI connectors 121.

In one embodiment, I/O bridge 122 is a chip that provides connection and control to one or more independent IDE or SCSI connectors, 124 and 125 respectively, to a USB (Universal Serial Bus) port 126, and to ISA (industry Standard Architecture) bus 130. In this embodiment, IDE connector 124 provides connectivity for up to two standard IDE-type devices such as hard disk drives, CDROM (Compact Disk-Read-Only Memory) drives, DVD (Digital Video Disk) drives, or TBU (Tape-Backup Unit) devices. In one similar embodiment, two IDE connectors 124 (second connector not shown) are provided, and each provide the EIDE (Enhanced IDE) architecture. In the embodiment shown, SCSI (Small Computer System Interface) connector 125 provides connectivity for up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

FIG. 1 shows one exemplary embodiment of a computer system that may be used with the present invention. However, other configurations, such as varying bus structures and memory arrangements are specifically contemplated and are within the scope of the invention.

Figure 2:
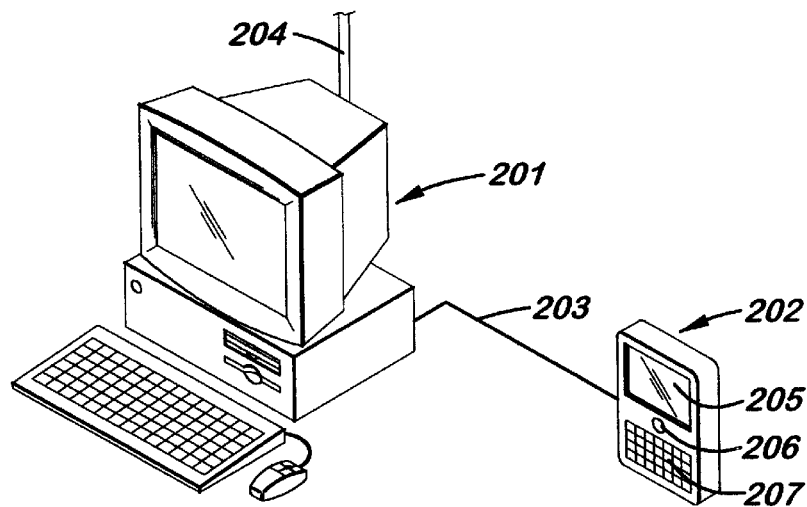
FIG. 2 shows a diagram of a network with various clients connected thereto, consistent with a preferred embodiment of the present invention.

FIG. 2 illustrates a networked computerized system 201 and a computerized client system 202. The client system 202 is linked to the networked computerized system 201 by a network connection 203, which in various embodiments is a fiber optic connection, an electrical connection, a wireless connection, or any other type of network data connection. The network connection serves to provide a link over which data can be exchanged between the networked system 201 and the client system 202. The networked computer system 201 is in some embodiments further connected to a network such as to the Internet via a network connection 204. In an alternative embodiment, the client device 202 may be configured to connect directly to the internet, in which case the networked computer system 201 is representative of the internet, rather being connected to the internet.

The client device of various embodiments has varying features, in some embodiments including but not limited to a display 205, a speaker 206, and a keypad or input 207. The display 205 in some embodiments is a touch screen-type display, as is used in many personal digital assistants such as the PalmPilot series of PDA devices produced by 3Com Corporation. The display of various embodiments may be monochrome or color, backlit or active matrix display, or any other type of display. The keypad 207 also varies in different embodiments of the invention, including an alpha-numeric keypad, a numeric keypad as is commonly found on mobile telephones, special purpose keys as are commonly found on PDA devices such as the PalmPilot PDA, and any other type of keypad entry device.

Figure 3:
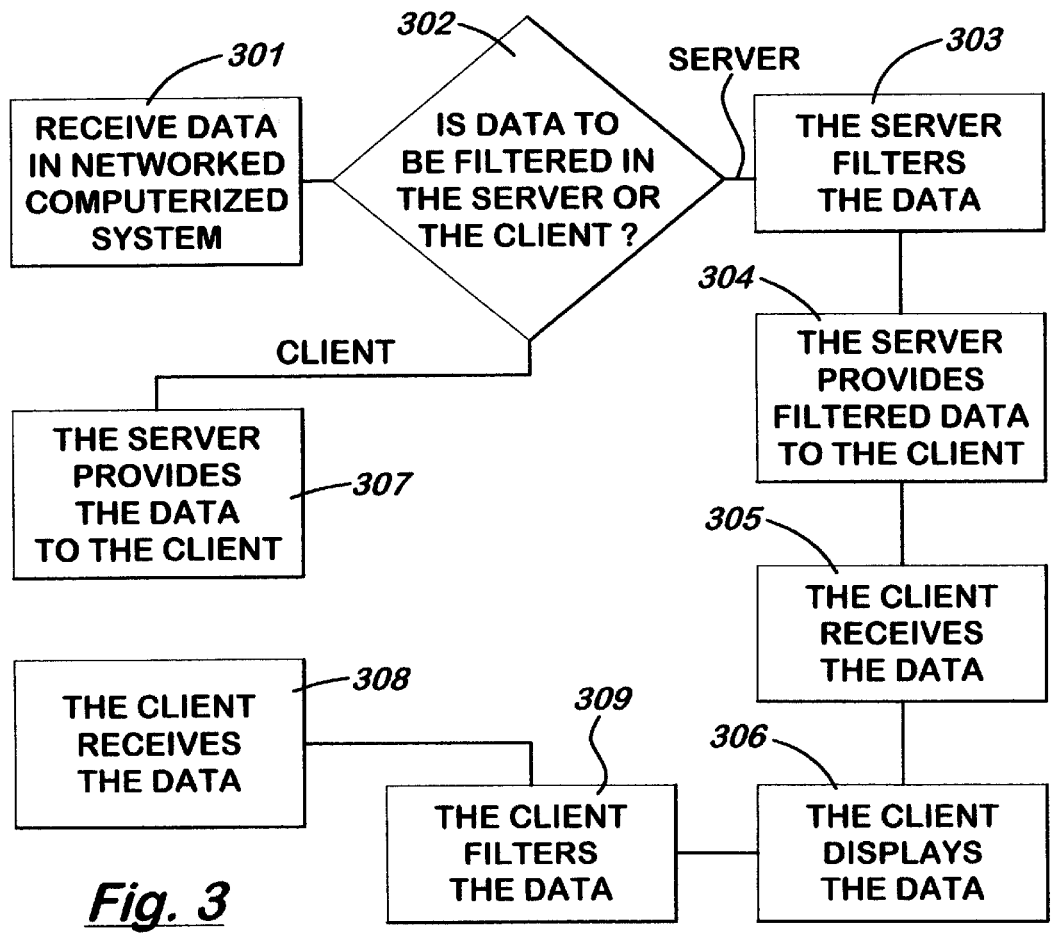
FIG. 3 is a flowchart of a method of practicing preferred embodiments of the present invention.

In operation, data provided to the client device 202 is parsed to identify content that is not meaningfully presentable on the client device, and content that can be presented on the device 202. The data that can be presented is then processed for display by the device 202. In various embodiments, the client device 202 parses the incoming data into meaningful and non-meaningful data, or the networked computerized system 201 functions as a server to the client device 202 by pre-filtering and parsing the data being sent to the device 202 so as to reduce the processing load on the client device 202. The flowchart of FIG. 3 shows a method of practicing various preferred embodiments of the invention described herein, incorporating the elements of FIG. 2.

In one embodiment, a networked computerized data server 201 filters data before providing the data to the client device 202. The data in various embodiments is received at the server, step 301, either originating at the server, or being retrieved via network connection 204 from other data sources, or being provided to the networked server 201 through any other suitable method. If the data is to be parsed and filtered in the server rather than the client, as determined at 302, the data is filtered at 303. The meaningful filtered data, having been parsed into meaningful and non-meaningful data, is then provided to the client device 202 at step 304. The client device 202 receives the data at 305, and then processes and displays the filtered parsed data at 306. In an alternative approach, the networked server 201 may store the filtered non-meaningful data for future processing and display, either by the networked server 201, or by the device 202.

In further alternative approaches, the data is filtered and parsed by the client device 202, after receipt of the complete data stream from a networked server 201. In such embodiments, the client 202 is capable of receiving a variety of data types, and filtering or parsing out those types of data it is capable of meaningfully displaying. The data again originates at the server 201 as shown at step 301 of FIG. 3. It is understood that, in an alternative embodiment, the client device 202 could receive a data stream directly from the Internet, wherein the Internet would be the networked system 201, and wherein connection 203 would be connection 204. After determining that the data is going to be filtered and parsed in the client rather than the server, step 302, the server provides the complete data stream to the client at 307. The client receives the data at 308, and filters the data at 309. The data is parsed into meaningful and non-meaningful data. The client processes and displays the meaningful data at step 306, and can either discard, ignore or save the filtered non-meaningful data. The saved data may then be transferred back to other devices for processing and display.

The data displayed on the client 202 may comprise any type of data currently existing, or to be developed, as can be displayed or presented on a computerized communication device. Examples of data within the scope of the invention include streaming audiovisual data, text data, streaming video data, streaming audio data, still image data, and other similar types of data. Not all types of data within the scope of the invention are likely to be meaningfully presentable on any single embodiment of a client device, establishing a need for the present invention. The present invention functions in various embodiments to filter and parse data, such that a presentable representation or portion of the data may be displayed on the client device without loading the device with data that the device is incapable of processing.

Filtering the data, which in various embodiments is implemented in the networked system 201 or the client device 202, therefore functions to represent the data in a manner that can be displayed on the client device. This is accomplished in selected embodiments of the invention by separating that part of the data that is displayable on the client device from that portion that is not so displayable. The portion of the data that is displayable is then displayed on the client device, while the portion that is not displayable is in various embodiments discarded, ignored, or stored for later retrieval by a device capable of, or configured for, displaying that part of the data.

The capabilities of the client to receive and present selected types of data is determined in selected embodiments of the invention by configuration of the client 202 or the networked server 201. The configuration information may be manually provided by a user, may be set by the client 202, or may be determined in any other manner. For example, the client 202 of one embodiment determines a configuration that reflects varying capabilities dependent on the available resources and other tasks executing on the client device. In this manner, the client device or its user can change the configuration properties of the client device to reflect a reduced ability to present selected types of data to conserve computing resources or power.

Once the configuration is established, it is used in filtering the data to determine what data is to be considered presentable and what data is not to be considered presentable (i.e., meaningful or non-meaningful) by the client. The clients that are unable to present various types of content or that are configured not to present various types of content can then display those filtered portions of the content that the client is capable of presenting in a meaningful way, and content the client cannot display can be stored for later retrieval, ignored, or discarded. The present invention therefore provides enhanced capability for a client to present at least a portion of a multimedia data stream which the device could not otherwise display in its entirety, and in further embodiments, to store at least that portion of the content that it cannot display.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A method of providing data from a server to a client, comprising:

determining a display capability of the client;

determining whether filtering the data to parse the data into meaningfully presentable data and non-meaningfully presentable data is to be performed by the server or by the client;

filtering the data to parse the data into meaningfully presentable data and non-meaningfully presentable data; and enabling the client to save the non-meaningfully presentable data for later use.

2. A method of providing data from a server to a client, comprising:

transmitting the data from the server to the client;

filtering the data to parse the data into meaningfully presentable data and non-meaningfully presentable data on the client; and processing the meaningfully presentable data on the client;

wherein the client is capable of providing a user with an option for setting a configuration such that certain data will be parsed into non-meaningful data even though the client has the capability to present the certain data.

3. The method of claim 1, wherein the client may be configured to predetermine whether certain data will be parsed into non-meaningful data.

4. The method of claim 1, wherein the client is capable of providing a user with an option for setting a configuration such that certain data will be parsed into non-meaningful data even though the client has the capability to present the certain data.

5. The method of claim 1, wherein data that is not meaningfully presentable on the client comprises data that the client configuration indicates is not to be presented on the client.

6. The method of claim 5, wherein the client configuration is alterable to provide varying degrees of user-determined capability for presenting data.

7. The method of claim 1, further comprising storing the non-meaningfully presentable data on the server.

8. The method of claim 2, further comprising storing the non-meaningfully presentable data on the client.

9. The method of claim 2, further comprising deleting the non-meaningfully presentable data from the client.

10. The method of claim 2, further comprising ignoring the non-meaningfully presentable data on the client.

11. A networked computerized system for transmitting data from said netwotked computerized system to a computerized client system, said networked computerized system being capable of:

determining a display capability of said computerized client system;

determining whether filtering the data to parse the data into meaningfully presentable data and non-meaningfully presentable data is to be performed by the networked computerized system or by the computerized client system;

filtering the data to parse the data into meaningfully presentable data and non-meaningfully presentable data; and enabling the computerized client system to save the non-meaningfully presentable data for later use.

12. A computerized client system being capable of:

receiving data from a networked computerized system;

filtering the data to parse the data into meaningfully presentable data and non-meaningfully presentable data on the computerized client system;

processing meaningfully presentable data on the computerized client system; and wherein the computerized client system is capable of providing a user with an option for setting a configuration such that certain data will be parsed into non-meaningful data even though the computerized client system has the capability to present the certain data.

13. The computerized system of claim 12, wherein the computerized client system may be configured to predetermine whether certain data will be parsed into non-meaningful data.

14. The computerized system of claim 12, wherein the computerized client system configuration is alterable to provide varying degrees of user-determined capability for presenting data.

15. The computerized system of claim 12, said computerized client system being capable of storing the non-meaningfully presentable data for later use.

16. A machine-readable medium with instructions stored thereon, the instructions when executed on an information handling system being capable of causing the information handling system to:

determine capability of a client device;

filter the data to parse the data into meaningfully presentable data and non-meaningfully presentable data; and transmit the meaningfully presentable data from the information handling system to the client devices;

wherein the client device is capable of providing a user with an option for settings a configuration such that certain data will be parsed into non-meaningful data even though the client device has the capability to present the certain data.

17. The machine-readable medium of claim 16, wherein the client device may be configured to predetermine whether certain data will be parsed into non-meaningful data.

18. The machine-readable medium of claim 16, wherein the client device configuration is alterable to provide varying degrees of user-determined capability for presenting data.

19. The machine-readable medium of claim 16, said medium being capable of enabling the client device to save the non-meaningfully presentable data for later use.

20. The method of claim 2 wherein the filtering of data to parse the data is performed by the client after the data has been transferred to the client by the server.

21. The method of claim 2 wherein the filtering of data to parse the data occurs after receipt of a complete data stream by the client from the server.

22. The method of claim 2 additionally comprising determining whether filtering the data to parse the data into meaningfully presentable data and non-meaningfully presentable data is to be performed by the server or by the client.

23. The method of claim 1 wherein filtering the data to parse the data comprises separating a part of the data that is displayable on the client from a part of the data that is not displayable on the client.

24. The method of claim 1 wherein the meaningfully presentable data includes at least a portion of a multimedia data stream that includes non-meaningfully presentable data.

* * * * *